United States Patent
Chan et al.

(10) Patent No.: US 7,092,458 B2
(45) Date of Patent: Aug. 15, 2006

(54) CARRIER RECOVERY CIRCUIT AND LOCK DETECTION CIRCUIT FOR MIXED PSK SIGNALS

(75) Inventors: Lap Shing Chan, Tokyo (JP); Shuji Murakami, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 866 days.

(21) Appl. No.: 09/814,867

(22) Filed: Mar. 23, 2001

(65) Prior Publication Data

US 2002/0071502 A1 Jun. 13, 2002

(30) Foreign Application Priority Data

Nov. 1, 2000 (JP) ............................. 2000-334839

(51) Int. Cl.
*H04L 27/22* (2006.01)
(52) U.S. Cl. ...................................... 375/326
(58) Field of Classification Search ........ 375/279–280, 375/324, 326, 329, 331–332, 281–284; 329/304, 329/306, 307; 455/265
See application file for complete search history.

(56) References Cited

U.S. PATENT DOCUMENTS

| | | | |
|---|---|---|---|
| 3,924,197 A * | 12/1975 | Okano et al. ............... 331/12 |
| 4,079,329 A * | 3/1978 | England et al. ............. 329/309 |
| 4,087,628 A * | 5/1978 | Sanders et al. ............. 375/327 |
| 4,387,342 A * | 6/1983 | Grosjean .................... 329/308 |
| 4,423,390 A * | 12/1983 | Waters ........................... 331/4 |
| 4,853,642 A * | 8/1989 | Otani et al. ................. 329/306 |
| 5,179,578 A * | 1/1993 | Ishizu ......................... 375/332 |
| 5,861,773 A | 1/1999 | Meyer |
| 6,177,835 B1 * | 1/2001 | Grebowsky et al. ........ 329/304 |
| 6,204,725 B1 * | 3/2001 | Ohishi ........................ 329/304 |
| 6,717,993 B1 * | 4/2004 | Shiraishi et al. ............ 375/329 |

* cited by examiner

Primary Examiner—Khanh Tran
(74) Attorney, Agent, or Firm—Buchanan Ingersoll PC

(57) ABSTRACT

A BPSK phase detection unit assumes that an input signal is a BPSK modulated signal in detecting a phase error of a recovered carrier and an 8PSK phase detection unit assumes that the input signal is an 8PSK modulated signal in detecting the phase error of the recovered carrier. An 8PSK frequency detection unit assumes that the input signal is an 8PSK modulated signal in detecting a frequency error of the recovered carrier. A selector selects the phase error detected by the BPSK phase detection unit or the phase error detected by the 8PSK phase detection unit. A carrier recovery unit recovers a carrier by adjusting a phase of the input signal, based on the selected phase error and the frequency error.

4 Claims, 8 Drawing Sheets

BPSK

QPSK

8PSK

16PSK

BPSK : ○
QPSK : □
8PSK : ○ □ △

AREA THAT OCCURS AFTER PULL-IN

BPSK

QPSK

8PSK

CARRIER RECOVERY CIRCUIT AND LOCK DETECTION CIRCUIT FOR MIXED PSK SIGNALS

BACKGROUND OF THE INVENTION

1. Field of the Invention

The present invention generally relates to a carrier recovery circuit and a lock detection circuit and, more particularly, to a carrier recovery circuit provided in a phase shift keying (PSK) demodulating circuit for recovering a carrier from an input signal in which a plurality of PSK modulated signals using different M-ary encoding techniques are mixed, and to a lock detection circuit for detecting a locked state of a negative feedback loop of the carrier recovery circuit, based on the input signal. In this specification, M of the M-ary encoding will be referred to as an M value.

2. Description of the Related Art

FIG. 10 is a block diagram showing a construction of a carrier recovery circuit according to the related art. Referring to FIG. 10, the carrier recovery circuit comprises a multiplier 101 for recovering a carrier by multiplying a complex signal (I, Q), produced by subjecting a PSK modulated signal to quadrature demultiplexing, by a signal from a numerically-controlled oscillator (NCO) 111. Numeral 102 indicates a phase detection unit for detecting a phase error of the recovered carrier. Numeral 104 indicates a frequency detection unit for detecting a frequency error of the recovered carrier. Numeral 106 indicates a multiplier for multiplying the phase error by a predetermined pgain. Numeral 107 indicates a multiplier for multiplying the frequency error by a predetermined fgain. Numeral 108 indicates an adder for adding a result of computation submitted by the multiplier 106 and a result of computation submitted by the multiplier 107. Numeral 109 indicates a loop filter coupled to an output of the adder 108. Numeral 110 indicates an accumulator for accumulating outputs from the loop filter 109. Numeral 111 indicates a numerically-controlled oscillator for generating a signal at a frequency commensurate with an output of the accumulator 110.

A description will now be given of the operation of the carrier recovering circuit according to the related art.

The carrier recovering circuit according to the related art includes a negative feedback loop. When an input signal is a PSK modulated signal having a single M value, the carrier is continuously recovered in a locked state.

The multiplier 101 multiplies the complex signals (I, Q) by the signal from the numerically-controlled oscillator 111. The signal produced as a result of multiplication is output as the recovered carrier. The recovered carrier is then subject to phase error detection by the phase detection unit 102. FIG. 11 is a graph showing the characteristics of the phase detection unit 102 exhibited when detecting a phase error from a BPSK modulated signal. The frequency detection unit 104 detects the frequency error. The multiplier 106 multiplies the phase error by the predetermined pgain. The multiplier 107 multiplies the frequency error by-the predetermined fgain. The adder 108 adds the result of computation submitted by the multiplier 106 and the result of computation submitted by the multiplier 107.

The loop filter 109, with predetermined filtering characteristics, subjects the output of the adder 108 to low-pass filtering. The accumulator 110 accumulates the outputs of the loop filter 109. The NCO 111 generates a signal having a frequency commensurate with the output of the accumulator 110 so as to output the generated signal to the multiplier 101.

With this construction, negative feedback is imposed so that the phase error and the frequency error are reduced. Once the locked state is achieved, the carrier is recovered in a stable manner.

Accordingly, the related-art recovery circuit is capable of properly recovering the carrier provided that the M value of the modulated PSK signal is constant.

However, the related-art recovery faces difficulties when the input signal contains a mixture of PSK modulated signals having different M values. For example, when the PSK modulated signals including the BPSK modulated signal, the QPSK modulated signal and the 8PSK modulated signal, which are used in the broadcast system (BS) in Japan, are mixed, convergence to a locked state and stable recovery of the carrier are difficult to achieve.

Once approach to remedy this drawback is to construct the carrier recovery circuit of FIG. 10 to adapt to a PSK modulated signal with a predetermined single M value (for example, a BPSK modulated signal). Associated with this, the input PSK modulated signal is monitored to determine whether the circuit is adapted for the M value of the input PSK modulated signal. As shown in FIG. 12, only when the M value of the input signal is the prescribed M value, pgain and fgain are set to predetermined non-zero values. Only the complex signal for the PSK modulated signal having the prescribed M value is selected so that the carrier is recovered. FIG. 12 illustrates how pgain and fgain are set to values corresponding to the M value of the input signal.

An example where M=2, 4, 8, that is, where the BPSK modulated signal, the QPSK modulated signal and the 8PSK modulated signal are involved, will now be discussed. FIG. 13A is a constellation diagram of the BPSK modulated signal in an I-Q plane; FIG. 13B is a constellation diagram of the QPSK modulated signal in an I-Q plane; and FIG. 13C is a constellation diagram of the 8PSK modulated signal in an I-Q plane. Each of the circles in FIGS. 13A–13C indicates a signal point of the respective modulated signal. Given that the power of phase error of the BPSK modulated signal, QPSK modulated signal and 8PSK modulated signal is indicated by $E_B$, $E_Q$ and $E_8$, respectively and the phase error that produces the minimum power is indicated by $\theta_{eq,B}$, $\theta_{eq,Q}$ and $\theta_{eq,8}$, respectively, the phase errors $\theta_{eq,B}$, $\theta_{eq,Q}$ and $\theta_{eq,8}$ are given by respective ones of the following equations.

$$E_B = \frac{1}{2}\theta^2 + \frac{1}{2}\theta^2 = \theta^2 \quad (1)$$

$$\left. \frac{dE_B}{d\theta} \right|_{\theta = \theta_{eq,B}} = 0 \Rightarrow \theta_{eq,B} = 0$$

$$E_Q = \frac{1}{2}(\Delta - \theta)^2 + \frac{1}{2}(\Delta + \theta)^2 = \Delta^2 + \theta^2 \quad (2)$$

$$\left. \frac{dE_Q}{d\theta} \right|_{\theta = \theta_{eq,Q}} = 0 \Rightarrow \theta_{eq,Q} = 0$$

$$E_8 = \quad (3)$$

$$\frac{1}{4}(\Delta' + \theta)^2 + \frac{1}{4}(3\Delta' + \theta)^2 + \frac{1}{4}(3\Delta' - \theta)^2 + \frac{1}{4}(\Delta' + \theta)^2 = 5\Delta'^2 + \theta^2$$

$$\left. \frac{dE_8}{d\theta} \right|_{\theta = \theta_{eq,8}} = 0 \Rightarrow \theta_{eq,8} = 0$$

where $\Delta = \pi/4$ and $\Delta' = \pi/8$.

FIG. 14 is a block diagram showing a configuration of a lock detection circuit according to the related art. Referring to FIG. 14, the lock detection circuit comprises a BPSK area detection unit 141 for detecting whether the position, in the I-Q plane, of the complex signal (I, Q) subject to quadrature demultiplexing is found in a reference range described later. The lock detection also comprises an adder 142, a delay circuit 143 and a comparator 144.

A description will now be given of the operation according to the related art. FIG. 15 shows reference areas for the BPSK modulated signal in the I-Q plane.

The BPSK area detection unit 141 segments the I-Q plane into four angular sectors, so that an area between $-\pi/4$ and $+\pi/4$ and an area between $3\pi/4$ and $5\pi/4$ being used as reference areas. That is, angular sectors between $(4i-1)\pi/(2M)$ and $(4i+1)\pi/(2M)$, where i is a positive number between 0 and M-1, are used as reference areas. In the case of BPSK modulated signal, M=2 so that the angular sector (i=0) between $-\pi/4$ and $+\pi/4$ and the angular sector (i=1) between $3\pi/4$ and $5\pi/4$ being are used as reference areas.

The BPSK area detection unit 141 determines by computation the position of input complex signal in the I-Q plane so as to determine whether the position is found in the reference area. If the position is found in the reference area, the BPSK area detection unit 141 outputs +1. Otherwise, it outputs −1.

The adder 142 and the delay circuit 143 accumulates the values provided by the BPSK area detection unit 141 so as to provide the accumulated value to the comparator 144. The comparator 144 determines whether the accumulated value reaches a predetermined threshold value. If it is determined that the accumulated value reaches the predetermined threshold value, the comparator 144 outputs a signal indicating that a locked state has set in.

More specifically, when demodulated signals located within the reference area (signals with a relatively higher probability of being a BPSK modulated signal) occur more frequently than the other demodulated signals, it is determined in the carrier recovery circuit adapted for the BPSK modulated signal according to the related art that the locked state has set in.

For example, given that the position of the complex signal subject to multiplication by the multiplier 101 in the carrier recovery circuit is rotated in a counterclockwise direction in the I-Q plane, the position moves away from a closest signal point (phase=0) while the position is $0-\pi/2$ phase shifted with respect to the signal point. Therefore, the phase error has a negative value and decreases in this range. The frequency error has a negative value. When the position of the complex signal is $\pi/2-\pi$ phase shifted with respect to the signal point, the position moves closer to the signal position (phase=$\pi$). The phase error has a positive value and decreases. The frequency error has a negative value.

When the negative feedback loop in the carrier recovery circuit is in a pull-in state, the position of the complex signal subject to multiplication by the multiplier 101 may be found in an area outside the reference area (non-reference area). When the negative feedback loop in the carrier recovery circuit is in a locked state, the position of the complex signal subject to multiplication by the multiplier 101 is more likely found in the reference area. FIG. 16 shows an example of how the output value of the delay circuit 143 in the lock detection circuit according to the related art varies. As shown in FIG. 16, in a pull-in state, the output value of the delay circuit 143 (that is, the accumulated value produced by the outputs of the BPSK area detection unit 141) decreases with oscillation. When the locked state sets in, the output value of the delay circuit 143 increases.

With the above-described construction of the carrier recovery circuit according to the related art, a carrier recovery from a PSK modulated signal having a predetermined M value is possible. However, no measures are provided to recover a carrier for a mixture of a plurality of PSK modulated signals having different M values, using a simple circuit configuration.

One approach would be to embed data indicating the M value in a modulated signal so that the M value is known when demodulating the signal based on the data so that the carrier recovery circuit adapted for the M value is used to recover a carrier. This requires provisions for processes and circuits for embedding the data in a modulating stage, and provisions for processes and circuits for detecting the data and switching between carrier recovery circuits in a demodulating stage. Therefore, difficulties with reduction in circuit scale and processing time remain.

SUMMARY OF THE INVENTION

Accordingly, a general object of the present invention is to provide a carrier recovery circuit and a lock detection in which the aforementioned drawback is eliminated.

Another and more specific object is to provide a carrier recovery circuit and a lock detection circuit capable of recovering a carrier even when an input signal is a mixture of PSK signals having different values of M of the M-ary encoding.

The aforementioned objects can be achieved by a carrier recovery circuit recovering a carrier from an input signal including a mixture of a plurality of PSK modulated signals having different values of M for M-ary encoding, comprising: a first phase detection unit assuming that the input signal is a PSK modulated signal having a minimum M value in detecting a phase error of a recovered carrier; a second phase detection unit assuming that the input signal is a PSK modulated signal having a maximum M value in detecting a phase error of the recovered carrier; a frequency detection unit assuming that the input signal is a PSK modulated signal having a maximum M value in detecting a frequency error of the recovered carrier; a selection unit for selecting one of the phase error detected by the first phase detection unit and the phase error detected by the second phase detection unit; and a carrier recovery unit for recovering the carrier by adjusting a phase of the input signal, based on the phase error selected by the selection unit and the frequency error detected by the frequency detection unit. Accordingly, there is provided an advantage in that a carrier is recovered from an input signal including a mixture of a plurality of PSK signals having different M values, using a small circuit scale.

The carrier recovery unit may comprises: first adjusting means for adjusting a magnitude of the phase error selected by the selection unit; second adjusting means for adjusting a magnitude of the frequency error; an adder for computing a sum of the phase error subject to adjustment by the first adjusting means and the frequency error subject to adjustment by the second adjusting means; a loop filter supplied with a result of computation by the adder; an accumulator for accumulating output values of the loop filter; oscillating means for oscillating an error signal having a frequency commensurate with an output value of the accumulator; and a multiplier for multiplying the error signal generated by the oscillating means by the input signal.

The first phase detection unit, second phase detection unit, frequency detection unit, selection unit and carrier recovery unit may constitute a negative feedback loop, and the selection unit may select the phase error detected by the first phase detection unit when the negative feedback loop is in a pull-in state and select the phase error detected by the second phase detection unit when the negative feedback loop is in a locked state.

The selection unit may comprise a lock detection circuit for detecting a locked state of the negative feedback loop based on the input signal, the lock detection circuit comprising: determining means for determining whether the recovered carrier is located in any of a total of M angular sectors produced by segmenting a complex plane into individual areas totaling twice the minimum M value included in the input signal, in which a plurality of PSK modulated signals having different M values are included; accumulating means for accumulating results of determination by the determining means; and lock detection means for detecting whether the negative feedback loop of the carrier recovery circuit is in a locked state based on the results of determination accumulated by the accumulating means.

The aforementioned objects can also be achieved by a lock detection circuit detecting a locked state of a negative feedback loop of a carrier recovery circuit, based on an input signal, comprising: determining means for determining whether a recovered carrier is located in any of a total of M angular sectors produced by segmenting a complex plane into individual areas totaling twice a minimum M value included in the input signal, in which a plurality of PSK modulated signals having different M values are included, an M value meaning a value of M of M-ary encoding; accumulating means for accumulating results of determination by the determining means; and lock detection means for detecting whether the negative feedback loop of the carrier recovery circuit is in a locked state based on the results of determination accumulated by the accumulating means. Accordingly, it is possible to detect a locked state without being affected by the noise, even when a plurality of PSK modulated signals having different M values are mixed.

BRIEF DESCRIPTION OF THE DRAWINGS

Other objects and further features of the present invention will be apparent from the following detailed description when read in conjunction with the accompanying drawings, in which:

FIG. 7 shows a area in which a phase error of a recovered carrier occurs after pull-in;

DETAILED DESCRIPTION OF THE PREFERRED EMBODIMENTS

First Embodiment

Figure 1:
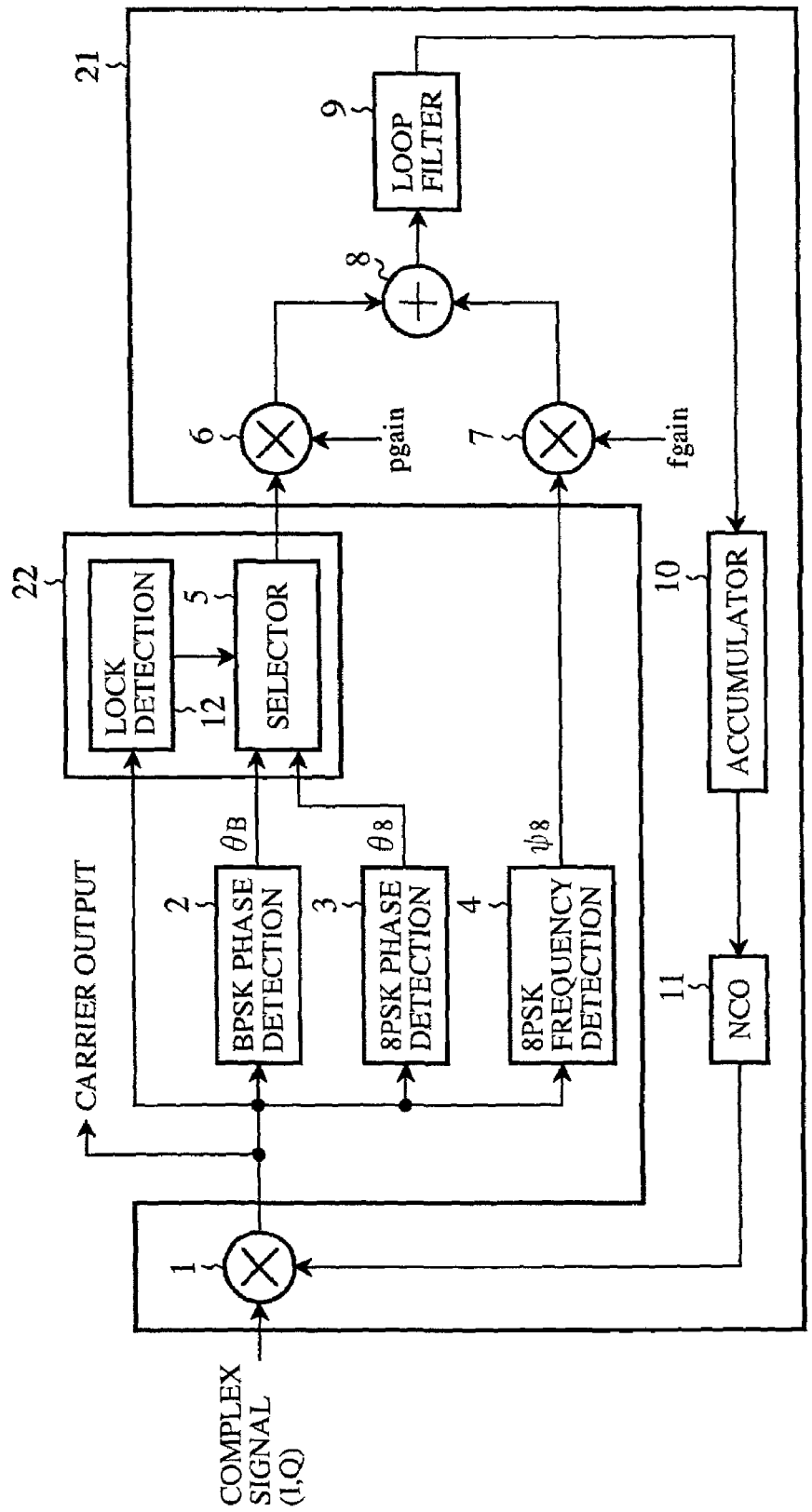
FIG. 1 is a block diagram showing a construction of a carrier recovery circuit according to a first embodiment of the present invention.

FIG. 1 is a block diagram showing a construction of a carrier recovery circuit according to a first embodiment of the present invention. Referring to FIG. 1, the carrier recovery circuit comprises: an adder 1 that recovers a carrier by multiplying a complex signal (I, Q) produced by subjecting an input signal to quadrature demultiplexing by an error signal generated by an NCO 11; a BPSK phase detection unit (first phase detection unit) which assumes that the input signal is a BPSK modulated signal in detecting a phase error $\theta_B$ of the recovered carrier; an 8PSK phase detection unit 3 (second phase detection unit) which assumes that the input signal is an 8PSK modulated signal in detecting a phase error $\theta_8$ of the recovered carrier; and an 8PSK frequency detection unit 4 (frequency detection unit) which assumes that the input signal is an 8PSK modulated signal in detecting a frequency error $\psi_8$ of the recovered carrier.

The carrier recovery circuit further comprises: a selector 5 for selecting the phase error detected by the BPSK phase detection unit 2 or the phase error detected by the 8PSK phase detection unit 3; a multiplier 6 (first adjusting means) for multiplying the phase error selected by the selected by the selector 5 by a predetermined value pgain; a multiplier 7 (second adjusting means) for multiplying the frequency error by a predetermined value fgain; and an adder 8 for computing a sum of the output of the multiplier 6 and that of the multiplier 7.

The circuit further comprises a loop filter 9, with a predetermined filtering characteristic, for subjecting the result of computation by the adder 8 to a filtering process, an accumulator 10 for accumulating output values of the loop filter 9, and a numerically-controlled oscillator (NCO) 11 for generating an error signal having a frequency commensurate with the output value of the accumulator 10.

The circuit further includes a lock detection circuit 12 for detecting a state of a negative feedback loop based on the recovered carrier. When the negative feedback loop is in a pull-in state, the lock detection circuit 12 causes the selector 5 to select the phase error detected by the BPSK phase detection unit 2. When the negative feedback loop is in a locked state, the lock detection circuit 12 causes the selector 5 to select the phase error detected by the 8PSK phase detection unit 3.

A carrier recovery unit 21 is constituted by the multipliers 6 and 7, the adder 8, the loop filter 9, the accumulator 10, the NCO 11 and the multiplier 1, so as to recover a carrier by adjusting the phase, based on the phase error selected by the selector 5 and the frequency error detected by the 8PSK frequency detection unit 4. A selection unit 22 is constituted by the lock detection circuit 12 and the selector 5.

A description will now be given of the operation according to the first embodiment.

The carrier recovery circuit according to the first embodiment is adapted to recover a carrier from an input signal in which M-ary PSK modulated signals having M values of 2, 4 and 8 are mixed. That is, the carrier is recovered from a mixture of the BPSK modulated signal, the QPSK modulated signal and the 8PSK modulated signal. Accordingly, in the first embodiment, the minimum M value is 2 and the maximum M value is 8.

The multiplier 1 multiplies the complex signal by the error signal generated by the NCO 11 so as to recover the carrier.

Figure 11:
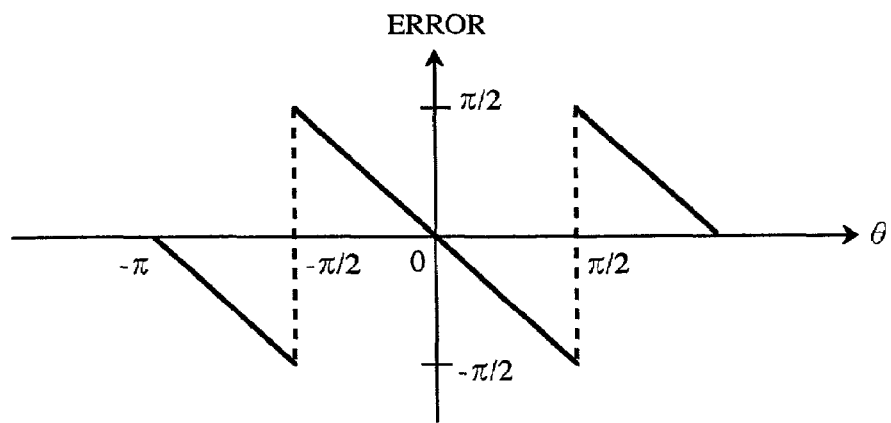
FIG. 11 is a graph showing characteristics of a phase detection unit exhibited when it detects a phase error from a BPSK modulated signal.
Figure 12:
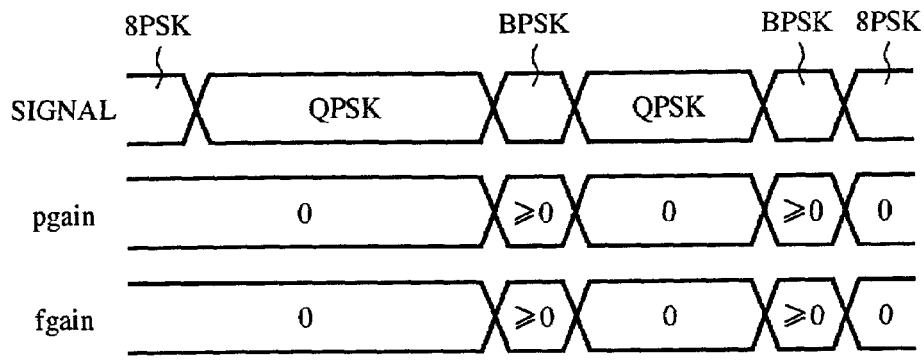
FIG. 12 shows how pgain and fgain are set depending on an M value.

The BPSK phase detection unit 2 assumes that the input signal is a BPSK modulated signal and detects the phase error $\theta_B$ of the recovered carrier. FIG. 11 shows a relationship between the phase $\theta$ of the recovered carrier and the phase error $\theta_B$ detected by the BPSK phase detection unit 2.

Figure 2:
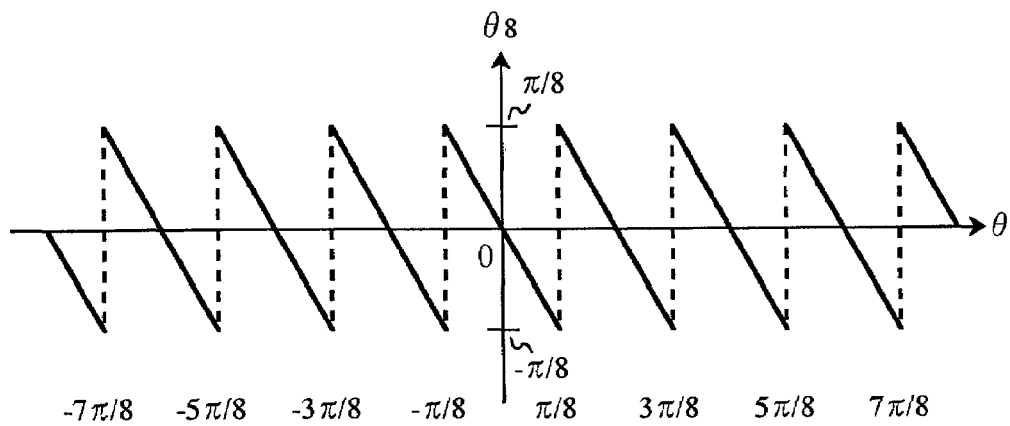
FIG. 2 shows a relationship between a phase of a recovered carrier and a phase error detected by an 8PSK phase detection unit.

The 8PSK phase detection unit 3 assumes that the input signal is an 8PSK modulated signal and detects the phase error $\theta_{B8}$ of the recovered carrier. FIG. 2 shows a relationship between the phase $\theta$ of the recovered carrier and the phase error $\theta_8$ detected by the 8PSK phase detection unit 3.

Figure 3:
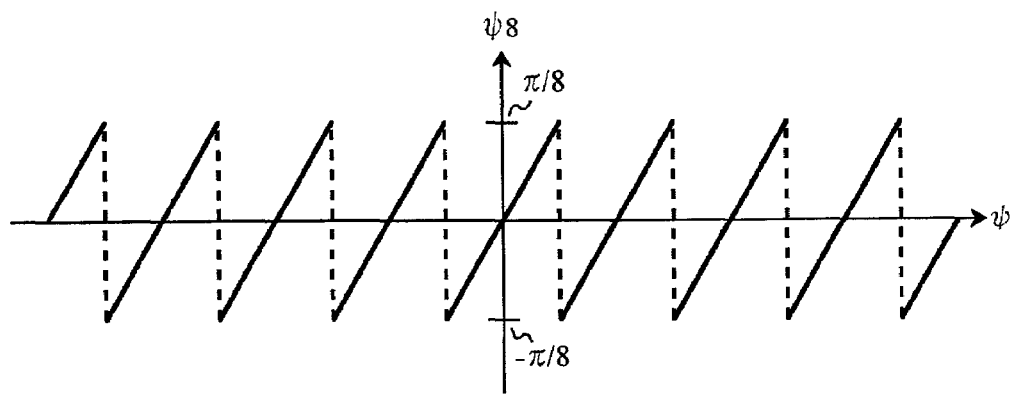
FIG. 3 shows a relationship between a frequency of a recovered carrier and a frequency error detected by a frequency detection unit.

The 8PSK frequency detection unit 4 assumes that the input signal is an 8PSK modulated signal and detects the frequency error $\psi_8$ of the recovered carrier. FIG. 3 shows a relationship between the frequency $\psi$ of the recovered carrier and the frequency error $\psi_8$ detected by the frequency detection unit 4.

Figure 4:
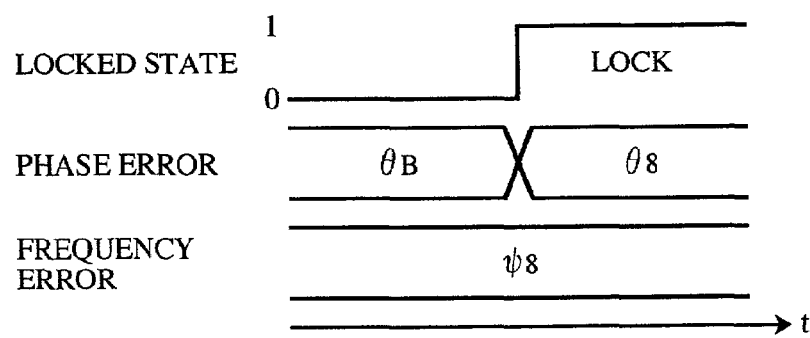
FIG. 4 shows an operation of a lock detection circuit.

The lock detection circuit 12 detects a state of the negative feedback loop based on the recovered carrier so as to determine whether the negative feedback loop is in a locked state. When the negative feedback loop is in a pull-in state, the lock detection circuit 12 causes the selector 5 to select the phase error $\theta_B$ detected by the BPSK phase detection unit 2. When the negative feedback loop is in a locked state, the lock detection circuit 12 causes the selector 5 to select the phase error $\theta_8$ detected by the 8PSK phase detection unit 3. The selector 5 selects either the phase error detected by the BPSK phase detection unit 2 or the phase error detected by the 8PSK phase detection unit 3 in accordance with the control effected by the lock detection circuit 12. FIG. 4 shows how the lock detection circuit 12 operates. As shown in FIG. 4, when the locked state is detected by the lock detection circuit 12, the phase error used in the negative feedback loop is switched from the phase error $\theta_B$ detected by the BPSK phase detection unit 2 to the phase error $\theta_8$ detected by the 8PSK phase detection unit 3. The frequency error detected by the 8PSK frequency detection unit 4 remains in use in the pull-in state and in the locked state.

The multiplier 6 multiplies the phase error selected by the selector 5 by a predetermined value pgain and the multiplier 7 multiplies the frequency error by a predetermined value fgain. The adder 8 computes a sum of the outputs of the multiplier 6 and the multiplier 7. The values pgain and fgain may be constant values or variable values commensurate with the state of the negative feedback loop.

The loop filter 9 functions, for example, as a low-pass filter having a predetermined filtering characteristic for subjecting the result of computation by the adder 8 to a filtering process. The accumulator 10 accumulates the outputs of the loop filter 9. The NCO 11 generates an error signal having a frequency commensurate with the output value of the accumulator 10.

As a result of the operation described above, negative feedback is effected so that the phase error and frequency error are reduced. When the locked state sets in, the carrier is recovered in a stable manner.

Figure 5A:
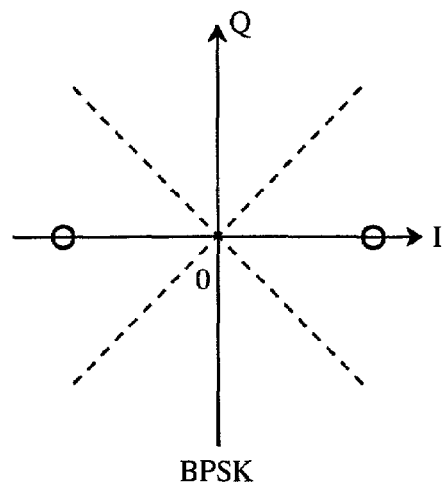
FIG. 5A is a constellation diagram showing signal points in an I-Q plane of a BPSK modulated signal.
Figure 5B:
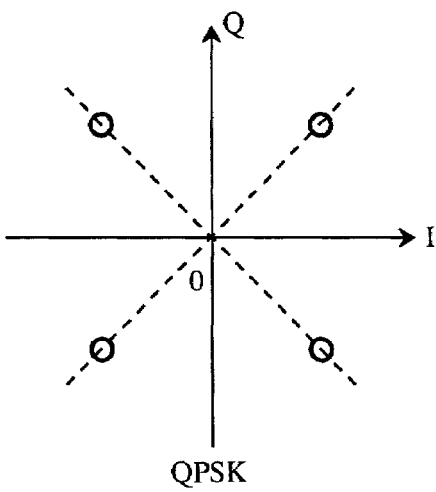
FIG. 5B is a constellation diagram showing signal points in an I-Q plane of a QPSK modulated signal.
Figure 5C:
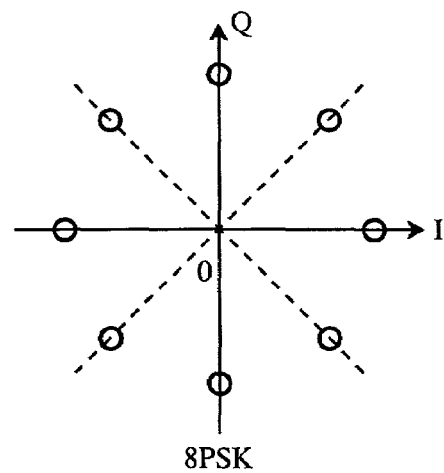
FIG. 5C is constellation diagram showing signal points in an I-Q plane of an 8PSK modulated signal.
Figure 5D:
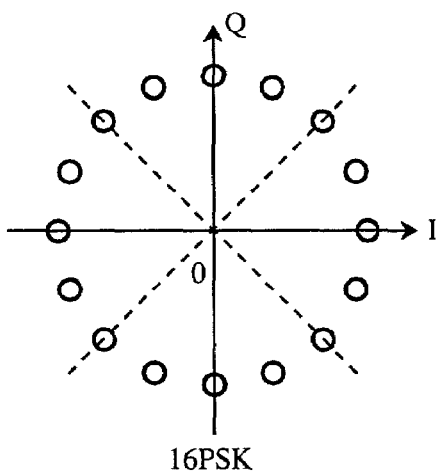
FIG. 5D is a constellation diagram showing signal points in an I-Q plane of a 16PSK modulated signal.
Figure 6:
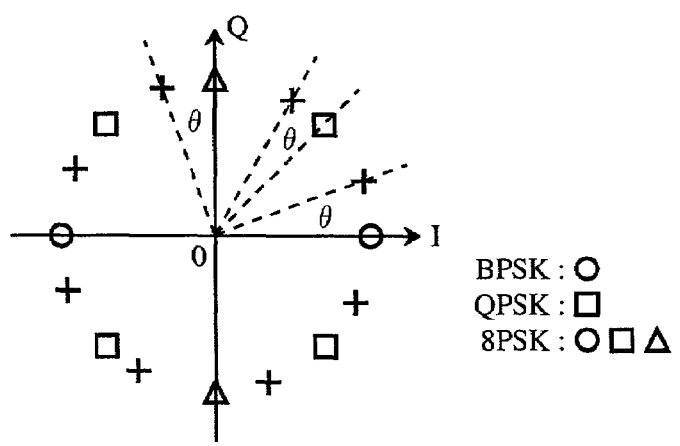
FIG. 6 is a constellation diagram showing signal points occurring when a BPSK phase detection unit detects a phase error of a carrier recovered from an input signal having a mixture of a BPSK modulated signal, a QPSK modulated signal and an 8PSK modulated signal.

When the negative feedback loop is in a pull-in state, the BPSK phase detection unit 2 assumes that the entirety of the input signal is a BPSK modulated signal in detecting the phase error of the BPSK modulated signal, the QPSK modulated signal and the 8PSK modulated signal. FIG. 5A is a constellation diagram showing signal points in an I-Q plane of a BPSK modulated signal; FIG. 5B is a constellation diagram showing signal points in an I-Q plane of a QPSK modulated signal; FIG. 5C is constellation diagram showing signal points in an I-Q plane of an 8PSK modulated signal; FIG. 5D is a constellation diagram showing signal points in an I-Q plane of a 16PSK modulated signal. FIG. 6 is a constellation diagram showing signal points occurring when a BPSK phase detection unit detects a phase error of a carrier recovered from an input signal having a mixture of a BPSK modulated signal, a QPSK modulated signal and an 8PSK modulated signal. If the 16PSK modulated signal is mixed in the input signal, the constellation of signal points is as shown in FIG. 5D.

Figure 13A:
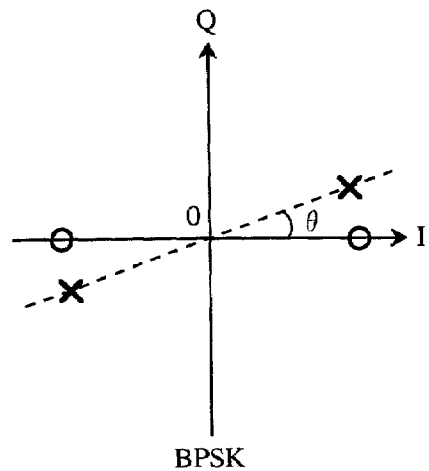
FIG. 13A is a constellation diagram of a BPSK modulated signal in an I-Q plane.
Figure 13B:
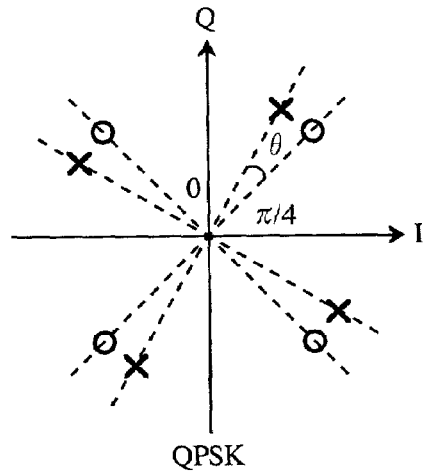
FIG. 13B is a constellation diagram of a QPSK modulated signal in an I-Q plane.
Figure 13C:
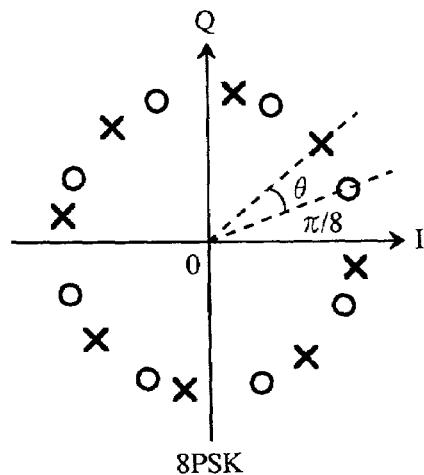
FIG. 13C is a constellation diagram of an 8PSK modulated signal in an I-Q plane.
Figure 14:
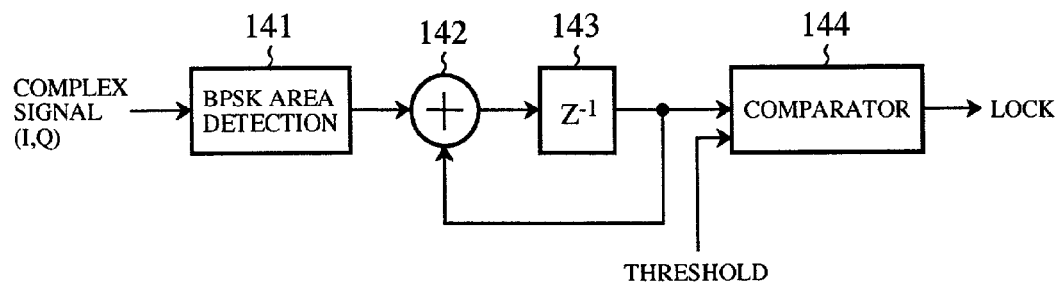
FIG. 14 is a block diagram showing a construction of a lock detection circuit according to the related art.
Figure 15:
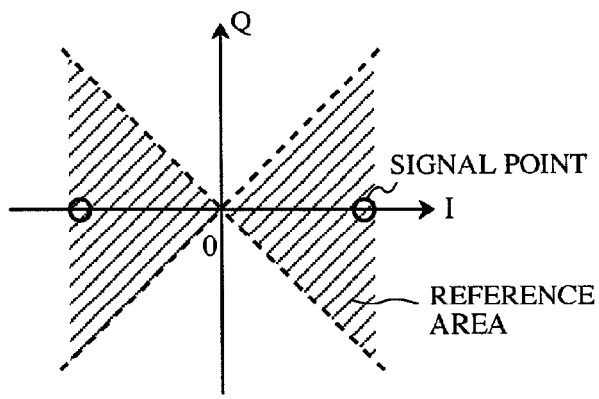
FIG. 15 reference areas for the BPSK modulated signal in the I-Q plane.
Figure 16:
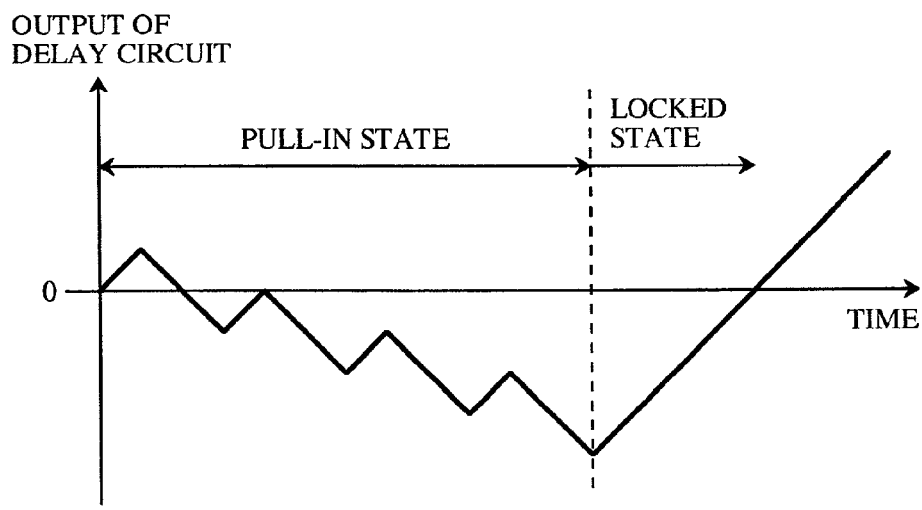
FIG. 16 shows an example of how the output value of the delay circuit in the lock detection circuit according to the related art varies.

When the input signal is solely constructed of the BPSK modulated signal, the QPSK modulated signal or the 8PSK modulated signal, the constellation is as shown in FIGS. 13A, 13B and 13C, respectively. FIGS. 5A–5D show the signal points resulting from the detection of the phase error by the BPSK phase detection unit 2. The signal points of the BPSK modulated signal and QPSK modulated signal do not change. However, the signal points of the 8PSK modulated signal are shifted by $\pi/8$.

The power of the phase error of the input signal comprising a mixture of the BPSK modulated signal, the QPSK modulated signal and the 8PSK modulated signal is given by $$E = P_B E_B + P_Q E_Q + P_8 E_8 \quad (4)$$

where $P_B$ indicates a proportion of the BPSK modulated signal in the input signal, $P_Q$ indicates a proportion of the QPSK modulated signal and $P_8$ indicates a proportion of the 8PSK modulated signal ($P_B + P_Q + P_8 = 1$). $E_B$ indicates a power of the phase error of the BPSK modulated signal, $E_Q$ indicates a power of the phase error of the QPSK modulated signal and $E_8$ indicates a power of the phase error of the 8PSK modulated signal.

Since the signal points remain unchanged for the BPSK modulated signal and the QPSK modulated signal, the power $E_B$ and the power $E_Q$ are expressed by the equations (1) and (2), respectively ($E_B = \theta^2$, $E_Q = \Delta^2 + \theta^2$).

Associated with the change in the signal points for the 8PSK modulated signal, the power $E_8$ of the 8PSK modulated signal is expressed by the equation (5)

$$E_8 = \frac{1}{4}\theta^2 + \frac{1}{4}(\Delta + \theta)^2 + \frac{1}{4}(2\Delta - \theta)^2 + \frac{1}{4}(\Delta - \theta)^2 = \theta^2 - \Delta\theta + \frac{3}{2}\Delta^2 \quad (5)$$

Accordingly, based on the equations (1), (2), (3) (4) and (5), the phase error $\theta_{eq}$ that gives a minimum power E of the phase error of the input signal is given by $$\frac{dE}{d\theta} = 2\theta - P_8\Delta \quad (6)$$

$$\left.\frac{dE}{d\theta}\right|_{\theta = \theta_{eq}} = 0 \Rightarrow \theta_{eq} = P_B\Delta'$$

For example, when $P_B=P_Q=P_8=1/3$, $\theta_{eq}=\pi/24$.

When $P_B=P_Q=0$ and $P_8=1$, $\theta_{eq}=\pi/8$. $\theta_{eq}$ could be a value between 0 and $\pi/8$.

Figure 7:
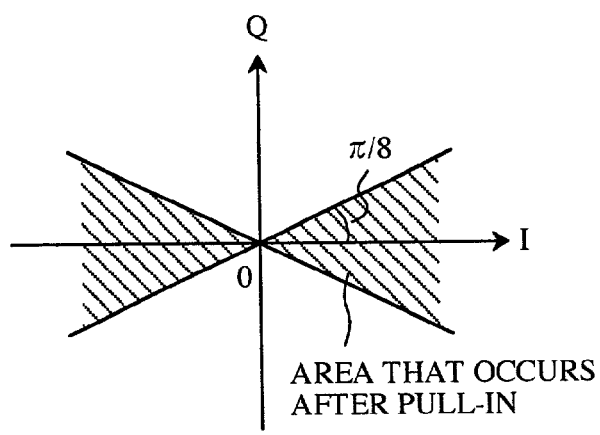

Thus, detection of the phase error of the input signal comprising a mixture of the BPSK modulated signal, QPSK modulated signal and 8 PSK modulated signal by the BPSK phase detection unit 2 results in the phase error being pulled into a range between $-\pi/8$ and $\pi/8$, or a range between $7\pi/8$ and $-7\pi/8$. FIG. 7 shows an area in which the phase error of the recovered carrier occurs after pull-in.

After the phase error $\theta_B$ is pulled into a range between $-\pi/8$ and $\pi/8$, or a range between $7\pi/8$ and $-7\pi/8$, the locked state sets in. The selector 5 is caused to select the phase error $\pi_8$ detected by the 8PSK phase detection unit 3. As a result of this, the phase of the recovered carrier is converged to the phase of the signal point of the 8PSK modulated signal so that the phase error of the recovered carrier is converged to 0.

Thus, the first embodiment of the invention herein described provides: the BPSK phase detection unit 2 which assumes that the input signal is a BPSK modulated signal in detecting the phase error of the recovered carrier; the 8PSK frequency detection unit 3 which assumes that the input signal is an 8PSK modulated signal in detecting the phase error of the recovered carrier; the 8PSK frequency detection unit 4 which assumes that the input signal is an 8PSK modulates signal in detecting the frequency error of the recovered carrier; the selector 5 selecting either the phase error detected by the BPSK phase detection unit 2 or the phase error detected by the 8PSK phase detection unit 3; and the carrier recovery unit 21 adjusting the phase based on the phase error selected by the selector 5 and the frequency error detected by the 8PSK frequency detection unit 4 so as to recover the carrier. Thereby, there is provided an advantage in that the carrier is recovered from an input signal comprising a mixture of a plurality of PSK signals having different M values, using a relatively small circuit scale.

Second Embodiment

Figure 8:
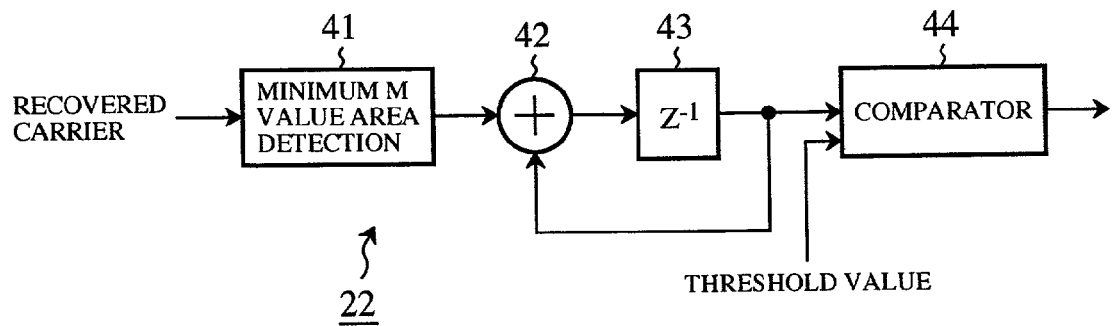
FIG. 8 is a block diagram showing a construction of a lock detection circuit according to a second embodiment of the present invention.

FIG. 8 is a block diagram showing a construction of a lock detection circuit according to a second embodiment of the present invention. Referring to FIG. 8, a minimum M value area detection unit 41 (determining means) determines whether the carrier recovered by the carrier recovery circuit is found in any of predetermined M angular sectors produced by segmenting the complex plane into individual areas totaling twice the minimum M value of the input signal comprising a mixture of plurality of PSK modulated signals having different M values. The lock detection circuit according to the second embodiment also includes an adder 42 and a delay circuit 43. The adder 42 and the delay circuit 43 operate to accumulate the output values of the minimum M value area detection unit 41. A comparator 44 (lock detection means) determines whether the negative feedback loop of the carrier recovery circuit is in a locked state, based on the output of the delay circuit 43 (that is, based on the accumulated value produced by the outputs of the minimum M value area detection unit 41).

A description will now be given of the operation according to the second embodiment.

It is assumed that the second embodiment is applied to the carrier recovery of the first embodiment. More specifically, it is assumed that a mixture of BPSK modulated signal, QPSK modulated signal and 8PSK modulated signal is input, where the minimum M value is 2 and the maximum M value is 8.

The minimum M value area detection unit 41 determines whether the input complex signal (recovered carrier) is located in a reference area. More specifically, a determination is made as to whether the input complex signal is found in either of the predetermined two angular sectors produced by segmenting the complex plane by slopes into four areas. If it is determined that the input complex signal is located in the reference area, the minimum M value area detection unit 41 outputs +1. Otherwise, it outputs −1. In this case, the reference areas extend between $-\pi/4$ and $+\pi/4$, and between $3\pi/4$ and $5\pi/4$.

The adder 42 and the delay circuit 43 accumulates the output values of the minimum M value area detection unit 41 so as to supply the accumulated value to the comparator 44. The comparator 44 compares the accumulated value with a predetermined threshold value so as to determine whether the negative feedback loop of the carrier recovery circuit is in a locked state. The comparator 44 outputs of a result of comparison.

When the carrier recovery circuit is in a pull-in state, the phase error detected by the BPSK phase detection unit 2 is used. With an increasing frequency of occurrence of BPSK modulated signals in the input signal, the carrier recovery circuit is brought into a locked state. The lock detection circuit determines whether the recovered carrier is found in the reference area for the PSK modulated signal having the minimum M value (BPSK modulated signal).

If the PSK modulates signal other than that having the minimum M value occurs, that is, if the QPSK modulated signal or the 8PSK modulated signal occurs, the probability of the signal being found in the reference area and the probability of the signal being found in the non-reference cancel each other on the average as the signal rotates in the I-Q plane with a predetermined angular speed. Consequently, the accumulated value of the output values of the minimum M value area detection unit 41 fails to be affected.

Figure 9:
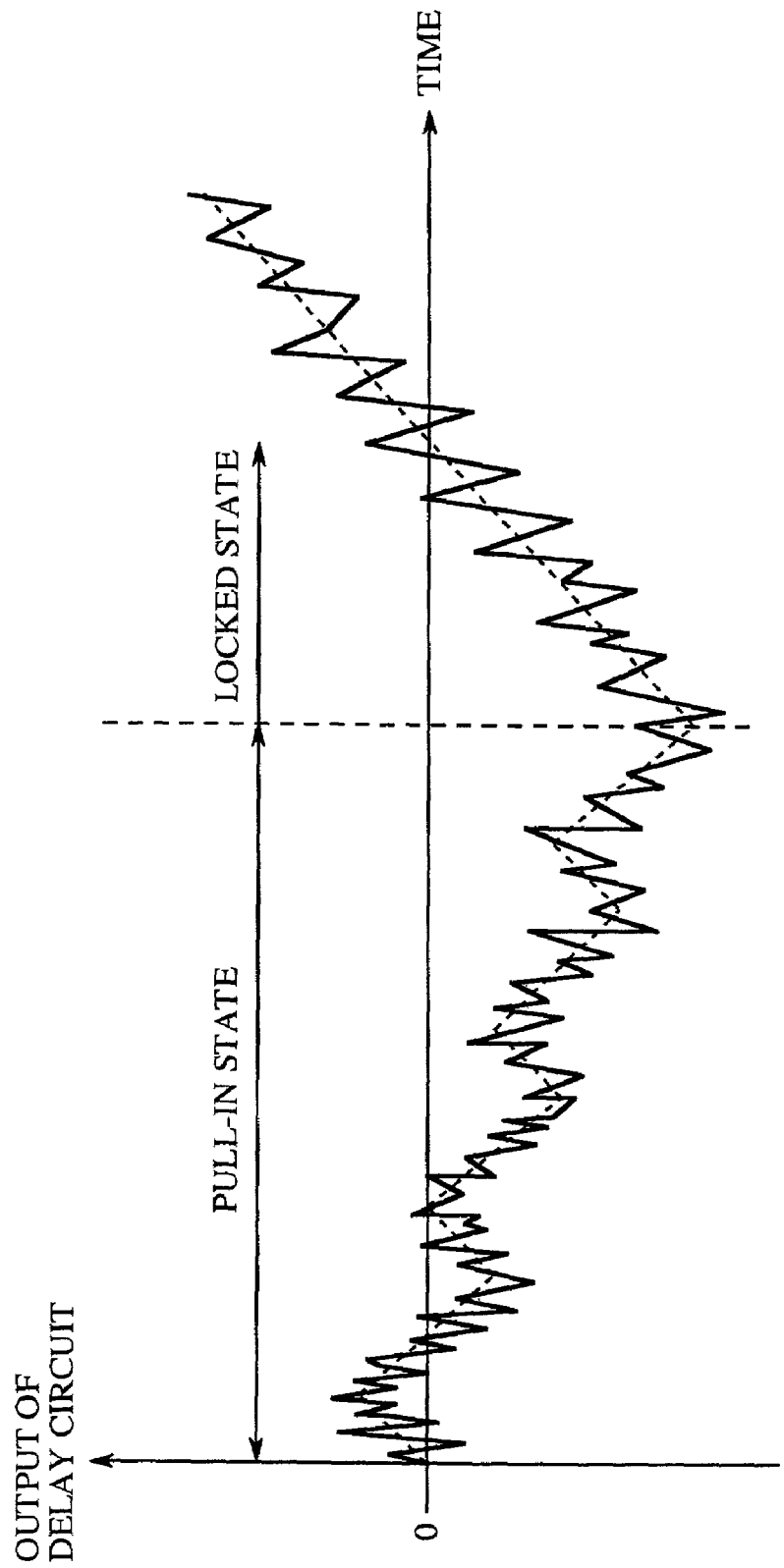
FIG. 9 is a graph showing how an output values of a delay circuit of a lock detection circuit according to a second embodiment vary.
Figure 10:
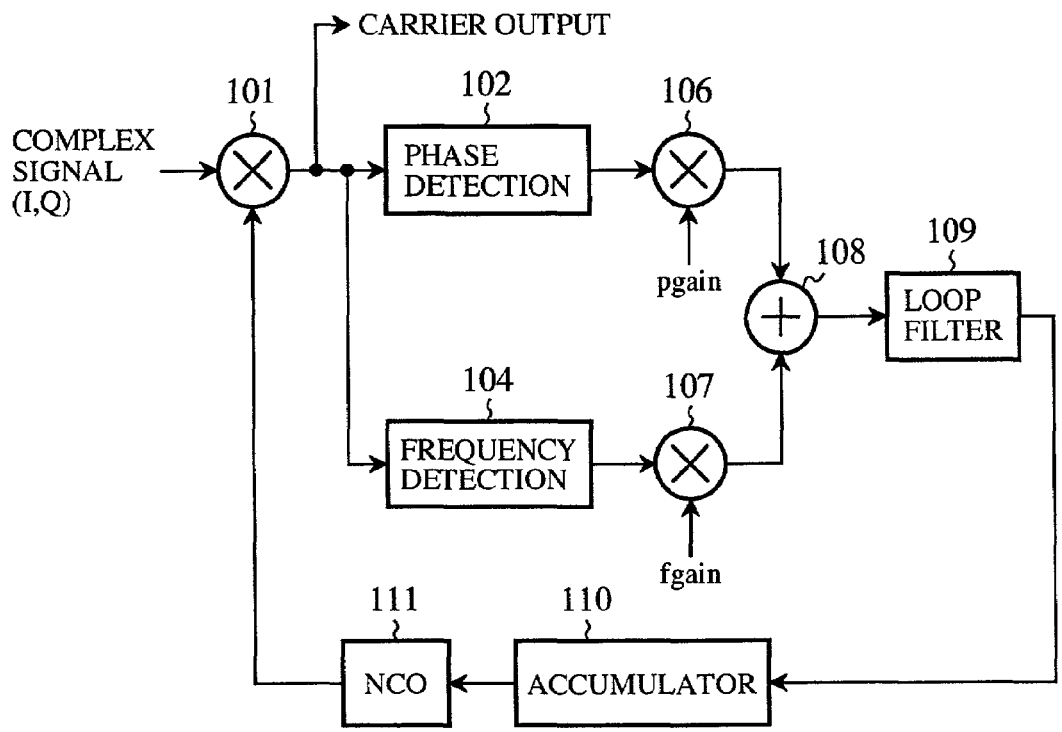
FIG. 10 is a block diagram showing a construction of a carrier recovery circuit according to the related art.

FIG. 9 is a graph showing how the output values of the delay circuit 43 of the lock detection circuit 12 according to the second embodiment vary.

As shown in FIG. 9, the accumulated value of the output values of the minimum M value area detection unit 41 varies in association with the occurrence of the QPSK modulated signal and the 8PSK modulated signal. In the locked state, however, the phase of the recovered carrier is most likely located in the reference area on the average. Consequently, the accumulated value of the output values of the minimum M value area detection unit 41 increases. Accordingly, when the accumulated value reaches a predetermined threshold value, the locked state can be acknowledged.

As described, according to the second embodiment, the minimum M value area detection unit 41 determines whether the carrier, recovered by the carrier recovery circuit from the input complex signal comprising a mixture of plurality of PSK modulated signals having different M values, is located in any of predetermined M angular sectors produced by segmenting the complex plane into a total of 2M areas. The adder 42 and the delay circuit 43 accumulate results of determination submitted by the minimum M value area detection unit 41. The comparator 44 determines whether the negative feedback loop of the carrier recovery circuit is in a locked state, based on the accumulation of the results of determination. Accordingly, even when a plurality of PSK modulated signals are mixed in an input signal, detection of the locked state is prevented from being affected by the noise.

While the description given above assumes a mixture of the BPSK modulated signal, QPSK modulated signal and 8PSK modulated signal in an input signal, carrier recovery and lock detection according to the invention may equally be applied to mixtures in which PSK modulated signals having other M values are also included.

The present invention is not limited to the above-described embodiments, and variations and modifications may be made without departing from the scope of the present invention.

What is claimed is:

1. A carrier recovery circuit recovering a carrier from an input signal including a mixture of a plurality of PSK modulated signals having different values of M for M-ary encoding, where M is $2^N$ and N is a positive number, comprising:
    a first phase detection unit assuming that the input signal is a PSK modulated signal having a minimum M value in detecting a phase error of a recovered carrier;
    a second phase detection unit assuming that the input signal is a PSK modulated signal having a maximum M value in detecting a phase error of the recovered carrier;
    a frequency detection unit assuming that the input signal is a PSK modulated signal having a maximum M value in detecting a frequency error of the recovered carrier;
    a selection unit for selecting one of the phase error detected by said first phase detection unit and the phase error detected by said second phase detection unit; and
    a carrier recovery unit for recovering the carrier by adjusting a phase of the input signal, based on the phase error selected by said selection unit and the frequency error detected by said frequency detection unit.

2. The carrier recovery circuit according to claim 1, wherein said carrier recovery unit comprises:
    first adjusting means for adjusting a magnitude of the phase error selected by said selection unit;
    second adjusting means for adjusting a magnitude of the frequency error;
    an adder for computing a sum of the phase error subject to adjustment by said first adjusting means and the frequency error subject to adjustment by said second adjusting means;
    a loop filter supplied with a result of computation by said adder;
    an accumulator for accumulating output values of said loop filter;
    oscillating means for oscillating an error signal having a frequency commensurate with an output value of said accumulator; and
    a multiplier for multiplying the error signal generated by said oscillating means by the input signal.

3. The carrier recovery circuit according to claim 1, wherein said first phase detection unit, second phase detection unit, frequency detection unit, selection unit and carrier recovery unit constitute a negative feedback loop, and
    said selection unit selects the phase error detected by said first phase detection unit when said negative feedback loop is in a pull-in state and selects the phase error detected by said second phase detection unit when the negative feedback loop is in a locked state.

4. The carrier recovery circuit according to claim 3, wherein said selection unit comprises a lock detection circuit for detecting a locked state of the negative feedback loop based on the input signal, said lock detection circuit comprising:
    determining means for determining whether the recovered carrier is located in any of a total of M angular sectors produced by segmenting a complex plane into individual areas totaling twice the minimum M value included in the input signal, in which a plurality of PSK modulated signals having different M values are included;
    accumulating means for accumulating results of determination by said determining means; and
    lock detection means for detecting whether the negative feedback loop of said carrier recovery circuit is in a locked state based on the results of determination accumulated by said accumulating means.

* * * * *